United States Patent [19]

Jeckel

[11] Patent Number: 5,221,231

[45] Date of Patent: Jun. 22, 1993

[54] MOTOR VEHICLE HEATING/AIR CONDITIONING SYSTEM

[75] Inventor: Alfred Jeckel, Rottenburg, Fed. Rep. of Germany

[73] Assignee: Mercedes-Benz AG, Fed. Rep. of Germany

[21] Appl. No.: 811,235

[22] Filed: Dec. 20, 1991

[30] Foreign Application Priority Data

Dec. 21, 1990 [DE] Fed. Rep. of Germany ....... 4041195

[51] Int. Cl.⁵ .............................................. B60H 3/06
[52] U.S. Cl. .................................................. 454/147
[58] Field of Search ............................. 454/146, 147

[56] References Cited

U.S. PATENT DOCUMENTS 2,975,696  3/1961  Jewell ................... 454/147
3,157,104 11/1964  Nallinger .............. 454/147
4,819,550  4/1989  Ioka ...................... 454/147

Primary Examiner—Robert G. Nilson
Attorney, Agent, or Firm—Evenson, Wands, Edwards, Lenahan & McKeown

[57] ABSTRACT

A motor vehicle heating/air-conditioning system of a motor vehicle has a water-removal device arranged in the fresh-air inlet duct, rising from the duct base and comprising a coarse-mesh lattice and a fine-mesh lattice resting against the latter. The water removed is carried away downwardly on the webs of the coarse-mesh lattice to the duct base which forms a water collection point with water drainage. In order to combine a favorable water-removal function with a good air-guidance function, the coarse-mesh lattice facing the incident air represents an air guide with predetermined throughflow and is pleated in a corrugated shape. A channel spanned by the fine-mesh lattice arranged in at least some areas is in each case formed between two upwardly-directed corrugation troughs. The water-removal device is placed in the region of a duct widening provided by a set-back wall portion, such that the water-removal device ends at a distance from the set-back wall portion.

9 Claims, 2 Drawing Sheets

MOTOR VEHICLE HEATING/AIR CONDITIONING SYSTEM

CROSS-REFERENCE TO RELATED APPLICATION

This application is related to an application entitled Fresh-Air Intake Duct For a Motor Vehicle filed on Dec. 20, 1991 under application Ser. No. 07/810,850 in the name of Peter Widmaier, Alfred Jeckel and Rolf Köhler, claiming priority of an application filed in Germany with Serial No. P 40 41 196.6 on Dec. 21, 1991.

BACKGROUND AND SUMMARY OF THE INVENTION

The present invention relates to a motor vehicle heating or air-conditioning system, with a water-removal device arranged in the fresh-air inlet duct, rising from the duct base and comprising a coarse-mesh lattice and a fine-mesh lattice resting against the latter, wherein the water removed by being carried away downwardly on the webs of the coarse-mesh lattice to the duct base which forms a water collection point with water drainage.

A known water-removal device extends over the entire duct cross-section and has a fine-mesh lattice placed in front of the coarse-mesh lattice, viewed in the flow direction as shown in German Patent No. 2,549,663.

It is an object of the present invention to provide a water-removal device with lattices lying in series and having a different mesh width such that the device has an air-guiding function in addition to the water-removal function.

This object has been achieved in a water-removal device in accordance with the present invention.

In a currently preferred embodiment of the present invention in which creates favorable flow conditions are created, the water-removal device is configured as a plate which extends transversely to the incident-flow direction and is inclined in the flow direction.

In another embodiment of the present invention, the water-removal device is formed as an air guide which projects approximately in a V-shape from the associated duct side wall and, on the incident air flow side, has only a coarse-mesh lattice, while the fine-mesh lattice is attached to the inside of the coarse-mesh lattice only from the vertex of the air guide. Droplet separation phenomena towards the free passage are thereby counteracted and the possibility of backflow to the rear side of the lattice against which the air flows is excluded.

To ensure that the air guide can be cleaned and, if required, exchanged, the air guide is covered at the top side by a portion of the upper duct wall which can be opened.

Unhindered water drainage is achieved if, together with the duct base and that portion of the upper duct wall which can be opened, the air guide surrounds a space from which the water drain leads off, because the air flow and the vacuum which arises due to it, which would prevent the water from flowing off, is deflected or weakened.

The dimensions of the coarse- and fine-mesh lattice which favorably influences the water-removal and air-guidance include a coarse-mesh width of 1 mm and a web width of 0.3 mm, and a fine-mesh width of about 0.25 mm and a web-width of about 0.1 mm.

BRIEF DESCRIPTION OF THE DRAWING

These and further objects, features and advantages of the present invention will become more apparent from the following detailed description of a currently preferred embodiment when taken in conjunction with the accompanying FIGS. 1 and 2 which are a perspective view of a motor vehicle heating/air-conditioning fresh-air intake duct in accordance with the present invention.

DETAILED DESCRIPTION OF THE INVENTION

Figure 1:
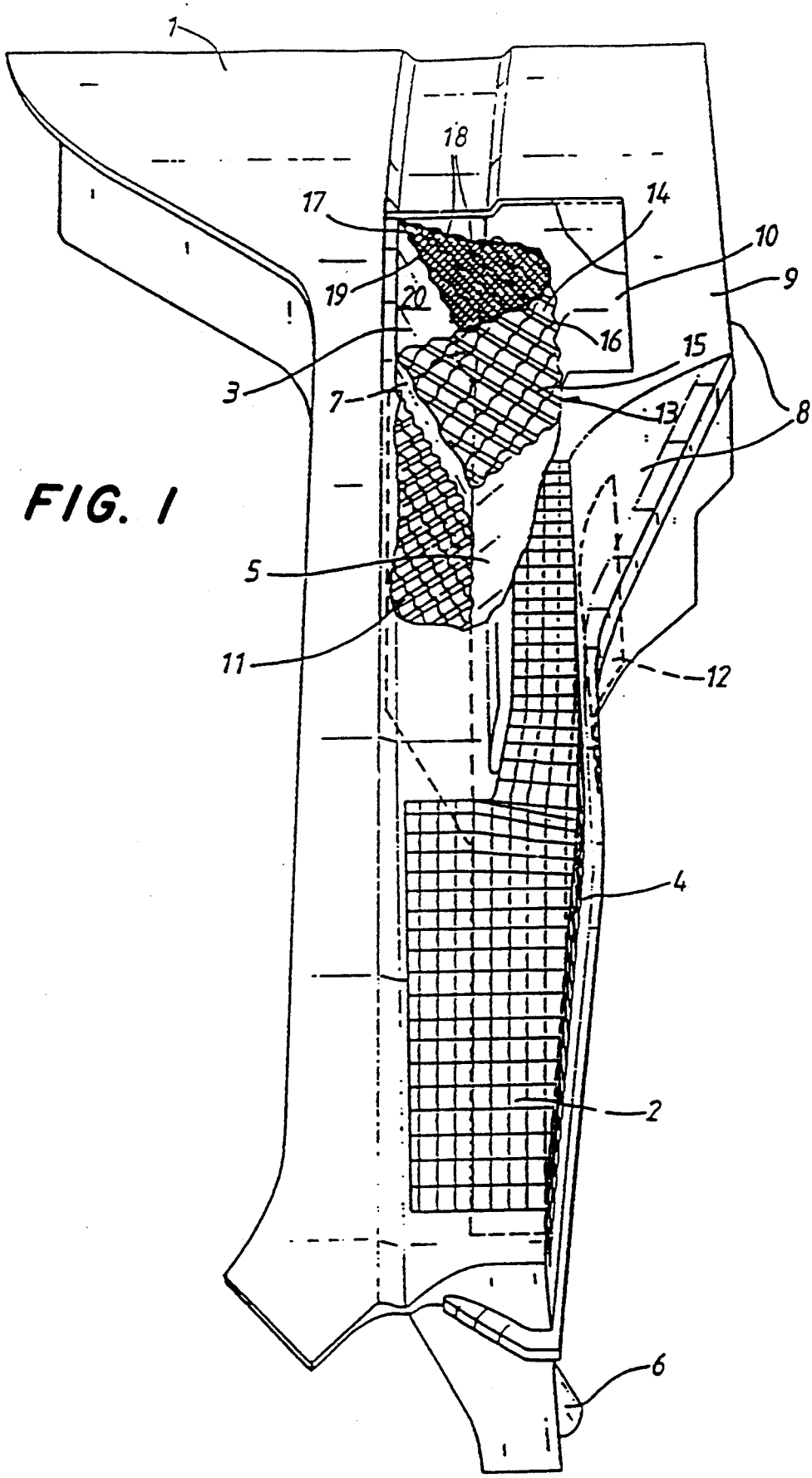

A fresh-air intake duct 1 of a heating/air-conditioning system extends in the transverse direction of a passenger vehicle and is arranged in a recessed manner in an installation space between the bonnet and the windscreen. The duct 1 is covered on the air-inlet side by an inlet grill 2 which filters out coarse impurities such as leaves. The fresh-air intake duct 1 has two duct side walls 3 and 4, connected to one another at the bottom by a duct base 5 which has a first water drain 6 and a second water drain 7. In the region of the duct side wall 4, the fresh-air intake duct 1 is provided with a set-back wall portion 8 and has an upper duct wall 9 with a lid portion 10 that can be opened. Over certain areas, lattice-shaped guide walls 11 and 12 are placed in front of the duct side walls 3 and 4 as a water-removal device situated on the walls.

A water-removal device 13 is arranged in the region of the set-back wall portion 8 of the duct side wall and projects from the opposite duct side wall 3 as seen in plan view, the water-removal device 13 has an approximately V-shape and projects into the air flow at least sufficiently far to ensure that the entire air flow emerging from the widening fresh-air duct 1 strikes the water-removal device 13 and, by virtue of the function of the water-removal device 13 as an air guide 14, is then deflected in the direction of the set-back wall portion 8.

The air guide 14 fulfills its water-removal function by virtue of the fact that it comprises a coarse-mesh corrugated lattice 15 with a mesh width of about 1 mm and a web width of about 0.3 mm, attached to which on this inside, beginning with its vertex 16, is a fine-mesh lattice 17 with a mesh width of about 0.25 mm and a web width of about 0.1 mm such that a channel 19 is formed between two essentially upwardly-directed corrugation troughs 18. The outflow side of the fine-mesh lattice 17, which can be a plastic material, greatly reduces the air velocity, with the result that the droplets deposited on the air-inlet side of the coarse-mesh lattice 15 can run off downwardly largely unhindered, and moisture still carried along is removed in the channels 19 on the outflow side. The air guide 14, the duct base 5 and the upper duct wall 9 with the lid portion 10 which can be opened form a flow-calmed space or plenum 20, from which the water drain 7 leads off. Through the openable lid portion 10, the air guide 14 with its favorable flow configuration can be removed and inserted again easily for purposes of cleaning and exchange. Elements of conventional construction (not shown) project from the fresh-air intake duct 1 on the inside to ensure that the air guide 14 can be secured in the correct position with the duct 1.

Figure 2:
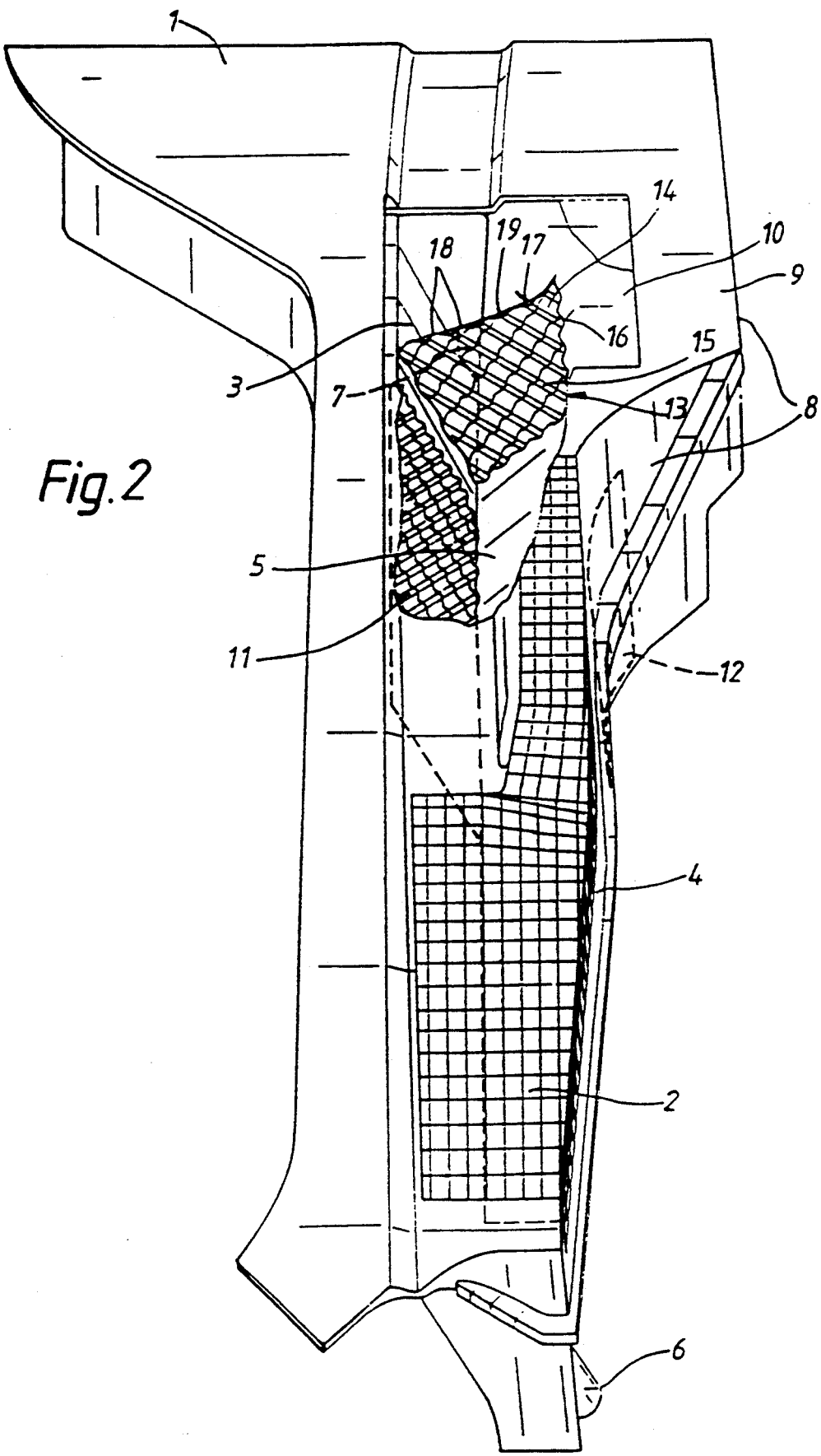

Referring to FIG. 2a water-removal and air-guiding function which is not quite as good as the illustrated embodiment but is still adequate is achieved in accordance with the principles of the present invention by configuring the device as a plate which extends transversely to the direction of the incident flow and inclined in the flow direction.

The coarse-mesh lattice is covered completely by the fine-mesh lattice on the reverse side of its incident-flow face, and lattice thus again forms a wall with only limited air permeability, of about 30%. In the channels which are each formed by the fine-mesh lattice spanning two essentially upward-directed corrugation troughs, the air velocity is accordingly so small that the water removed can run off on the reverse side of the coarse-mesh lattice towards the duct base.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. In motor vehicle heating/air-conditioning system, a fresh-air inlet duct comprises a water-removal device, rising from a base of the duct and having a coarse-mesh lattice and a fine-mesh lattice resting against the base, with water removed being carried away downwardly on webs of the coarse-mesh lattice to the duct base which forms a water collection point with water drainage, wherein the coarse-mesh lattice facing incident air has a corrugated shape, a channel spanned by the fine-mesh lattice arranged in at least some areas is formed between two upward-directed corrugation troughs, and the water-removal device is place in widened region of the duct formed by a set-back wall portion such that the water-removal device ends at a distance from the set-back wall portion.

2. The fresh-air inlet duct according to claim 1, wherein the water-removal device is plate-shaped and extends transversely to a flow direction of the incident air and is inclined in the flow direction.

3. The fresh-air inlet duct according to claim 1, wherein the water-removal device is an air guide projecting approximately V-shaped from an associated duct side wall and, on an incident air flow side, has only a coarse-mesh lattice, and the fine-mesh lattice is operatively attached to an inside of the coarse-mesh lattice, and the fine-mesh lattice is operatively attached to an inside of the coarse-mesh lattice only from a vertex of the air guide.

4. The fresh-air inlet duct according to claim 3, wherein the air guide is covered at the top side by an openable portion of the upper duct wall.

5. The fresh-air inlet duct according to claims 4, wherein together with the duct base and the openable portion of the upper duct wall, the air guide surrounds a space off from which leads a water drain.

6. The fresh-air inlet duct according to claim 1, wherein the coarse-mesh lattice has a mesh width of about 1 mm and a web width of about 0.3 mm.

7. The fresh-air inlet duct according to claim 3, wherein the coarse-mesh lattice has a mesh width of about 1 mm and a web width of about 0.3 mm.

8. The fresh-air inlet duct according to claim 1, wherein the fine-mesh lattice comprises a finely spun plastic material, the mesh width of which is about 0.25 mm and the web width of which is about 0.1 mm.

9. The fresh-air inlet duct according to claim 3, wherein the fine-mesh lattice comprises a finely spun plastic material, the mesh width of which is about 0.25 mm and the web width of which is about 0.1 mm.

* * * * *